United States Patent
Szabela et al.

(10) Patent No.: US 7,909,132 B2
(45) Date of Patent: Mar. 22, 2011

(54) APPARATUS FOR USE IN TURNING STEERABLE VEHICLE WHEELS

(75) Inventors: William A. Szabela, Brookston, IN (US); James R. Johnson, Lafayette, IN (US); Kevin E. Boyle, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 194 days.

(21) Appl. No.: 12/284,185

(22) Filed: Sep. 19, 2008

(65) Prior Publication Data

US 2010/0071988 A1     Mar. 25, 2010

(51) Int. Cl.
*B62D 5/04* (2006.01)

(52) U.S. Cl. .......................... 180/446; 180/444; 701/42

(58) Field of Classification Search .................. 180/443, 180/444, 446; 70/41, 42; 701/41, 42
See application file for complete search history.

(56) References Cited

U.S. PATENT DOCUMENTS

| | | | |
|---|---|---|---|
| 4,735,271 A | 4/1988 | Shimizu | |
| 4,981,189 A | 1/1991 | Wilder | |
| 5,327,986 A * | 7/1994 | Saita | ............................. 180/446 |
| 6,155,376 A | 12/2000 | Cheng | |
| 6,547,029 B2 * | 4/2003 | Peppler et al. | ................ 180/402 |
| 6,644,430 B2 | 11/2003 | Harer et al. | |
| 6,655,709 B2 | 12/2003 | Sherwin et al. | |
| 6,684,727 B2 | 2/2004 | Krause | |
| 6,782,966 B2 | 8/2004 | Sahr et al. | |
| 6,960,145 B2 | 11/2005 | Fraley, Jr. et al. | |
| 6,966,398 B2 | 11/2005 | Williams et al. | |
| 7,055,646 B2 | 6/2006 | Bugosh | |
| 7,240,760 B2 | 7/2007 | Sherwin | |
| 7,737,648 B2 * | 6/2010 | Nagase et al. | ........... 318/400.02 |
| 2004/0040780 A1 | 3/2004 | Szabela et al. | |
| 2006/0278466 A1 * | 12/2006 | Cheng | ........................... 180/444 |
| 2007/0051555 A1 | 3/2007 | Miller et al. | |
| 2010/0152971 A1 * | 6/2010 | Shiino et al. | .................... 701/41 |

* cited by examiner

*Primary Examiner* — Kevin Hurley

(74) *Attorney, Agent, or Firm* — Tarolli, Sundheim, Covell & Tummino LLP

(57) ABSTRACT

An approved apparatus (10) for turning steerable wheels (14, 16) of a vehicle includes a pinion (28) which is disposed in meshing engagement with a rack portion (32) of a steering member (12). A steering column (22) is connected with a pinion (28) and with a vehicle steering wheel (20). A ball nut assembly (38) is connected with an externally threaded portion (36) of the steering member (12). A first motor (72) is connected with the steering column (22) at a location between the pinion (28) and steering wheel (20). A second motor (48) is connected with the ball nut assembly (38). A closed loop assembly (60) may be provided to control operation of the first motor (72). An open loop assembly (82) may be provided to control operation of the second motor (48).

14 Claims, 1 Drawing Sheet

APPARATUS FOR USE IN TURNING STEERABLE VEHICLE WHEELS

TECHNICAL FIELD

The present invention relates to an apparatus for use in turning steerable vehicle wheels in response to rotation of a steering wheel.

BACKGROUND OF THE INVENTION

A known vehicle steering apparatus includes a steering member which is axially movable to effect turning movement of steerable vehicle wheels. A pinion is disposed in meshing engagement with a rack portion of the steering member. A steering column interconnects the pinion and a vehicle steering wheel.

In addition, this known steering apparatus includes a ball nut assembly which is connected with an externally threaded portion of the steering member. A motor is connected with the ball nut assembly. The motor is operable to effect rotation of the ball nut assembly relative to the steering member. A steering apparatus having this general construction is disclosed in U.S. Pat. No. 4,735,271 and U.S. Pat. No. 7,055,646.

SUMMARY OF THE INVENTION

The present invention relates to an apparatus which includes a pinion which is disposed in meshing engagement with a rack portion of a steering member. The steering member is movable relative to a vehicle to effect turning movement of steerable vehicle wheels. A steering column interconnects the pinion and a vehicle steering wheel. A ball nut assembly is connected with an externally threaded portion of the steering member.

In accordance with one of the features of the present invention, a first motor is connected with a steering column at a location between the pinion and the steering wheel. A second motor is connected with the ball nut assembly. The second motor is operable to effect rotation of the ball nut assembly relative to the steering member.

In accordance with another feature of the present invention, a closed loop assembly is connected with the steering column. The closed loop assembly includes a first control unit which is connected with a first sensor and the first motor. The first sensor provides an output to the first control unit as a function of torque applied to and rotation of the steering wheel. A feedback sensor is connected with the first control unit. The first control unit is operable to effect operation of the first motor as a function of the outputs from the first sensor and the feedback sensor.

In accordance with another feature of the present invention, an open loop assembly includes the second motor and a second control unit. The second control unit is connected with at least one of the first sensor and the feedback sensor. The second control unit is operable to control operation of the second motor as a function of the output from at least one of the first sensor and the feedback sensor.

BRIEF DESCRIPTION OF THE DRAWINGS

The foregoing and other features of the present invention will become more apparent to those skilled in the art to which the present invention relates upon reading the following description with reference to the accompanying drawings, in which.

DESCRIPTION OF ONE EMBODIMENT OF THE INVENTION

Figure 1:
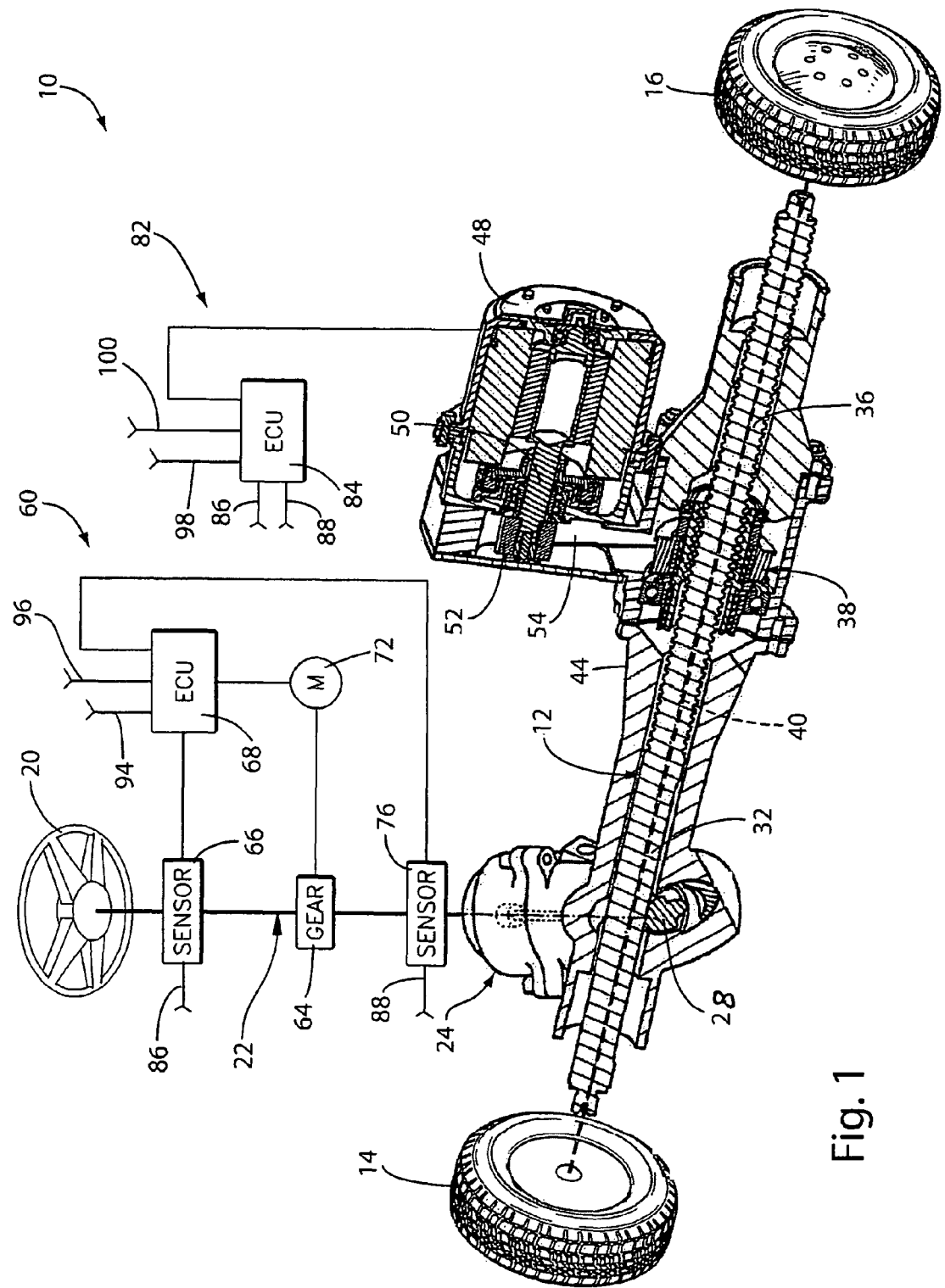
FIG. 1 is schematic illustration depicting a construction of an apparatus constructed in accordance with the present invention to turn steerable vehicle wheels.

An apparatus 10 (FIG. 1) is constructed in accordance with the present invention and is used to turn steerable vehicle wheels. The apparatus 10 includes a steering member 12 which is connected to steerable vehicle wheels 14 and 16. Upon rotation of a steering wheel 20, force is transmitted through a steering column 22 to a steering gear 24.

The steering gear 24 includes a pinion 28 which is rotatable under the influence of force transmitted through the steering linkage 22. The steering member 12 includes a rack portion 32 having rack gear teeth disposed in meshing engagement with the pinion 28. In addition, the steering member 12 has an externally threaded portion 36 which is disposed in a coaxial relationship with the rack portion 32.

A ball nut assembly 38 extends around the externally threaded portion 36 and has a plurality of balls (not shown) which are disposed in engagement with the externally threaded portion. The ball nut assembly 38 is rotatable about a longitudinally extending central axis 40 of the steering member 12. Rotation of a ball nut assembly 38 relative to the steering member 12 is effective to move the steering member axially relative to a housing 44. The housing 44 encloses the pinion 28 and ball nut assembly 38 along with at least a portion of the steering member 12.

A reversible electric motor 48 is operable to rotate the ball nut assembly 38 relative to the steering member 12. The electric motor 48 has an output shaft 50 which is connected to a drive pulley 52. The drive pulley 52 is connected with the ball nut assembly 38 by a drive belt 54. The drive belt 54 transmits force to the ball nut assembly 38 to rotate the ball nut assembly about the central axis 40 of the steering member 12 during operation of the motor 48 and rotation of the drive pulley 52. The ball nut assembly 38 and drive pulley 52 may have the same construction as is disclosed in U.S. Pat. No. 7,055,646. Of course, they may have a different construction if desired.

A closed loop assembly 60 is connected with the steering column 22. The closed loop assembly 60 is a control system which automatically acts to maintain a desired output through the steering column 22 to the pinion 28 in response to rotation of the steering wheel 20. The closed loop assembly 60 includes a gear unit 64 which is connected with the steering column 22 at a location between the steering wheel 20 and pinion 28.

A first or upper sensor 66 is connected with the steering column 22 at a location between the gear unit 64 and the steering wheel 20. A first control unit 68 is connected with the sensor 66. The sensor 66 provides an output to the control unit 68 as a function of the torque applied to and an angular rotation of the steering wheel 20.

A first reversible electric motor 72 is connected with the control unit 68 and the gear unit 64. The gear unit 64 is a differential gear assembly having a known construction. However, it is contemplated that the gear unit 64 may include a single spur gear which is connected with the steering linkage 22 and driven by a spur gear connected with the electric motor 72.

The first motor 72 may be operated to cause the gear unit 64 to assist the operator in rotating the steering wheel 20. The first motor 72 may also be operated to resist rotation of the steering wheel 20 to provide "feel" to the operator rotating the steering wheel. The control unit 68 effects operation of the motor 72 to either assist or resist steering wheel rotation as a function of vehicle operating conditions.

A feedback sensor 76 is connected with the control unit 68. The feedback sensor 76 provides an output to the control unit 68 as a function of rotation of and torque applied to a portion of the steering linkage 22 connected to the output of the gear unit 64. The feedback sensor 76 is connected to a portion of the steering column 22 disposed between the gear unit 64 and pinion 28.

The control unit 68 compares the output from the feedback sensor 76 with the output from the first sensor 66. The control unit effects operation of the reversible electric motor 72 as a function of the outputs from the first sensor 66 and the feedback sensor 76.

An open loop assembly 82 includes an electronic control unit 84 which is connected with the reversible electric motor 48. The electronic control unit 84 is connected with the first sensor 66 by a conductor 86. The electronic control unit 84 connected with the feedback sensor 76 by a conductor 88.

The electronic control unit 84 compares the output of the two sensors 66 and 76 and effects operation of the motor 48 as a function of the output of these two sensors. However, it is contemplated that the electronic control unit 84 may be connected with only one of the sensors, for example the first sensor 66. Alternatively, the electronic control unit 84 may be connected with only the feedback sensor 76. Regardless of which sensor or sensors the electronic control unit 84 is connected, the electronic control unit effects operation of the motor 48 to drive the belt 54 and rotate the ball nut assembly 38 to obtain movement of the steerable vehicle wheels 14 and 16 corresponding to rotation of the steering wheel 20.

In addition to being responsive to the torque applied to and the angular rotation of the steering wheel 20, the electronic control units 68 and 84 may have inputs which vary as a function of vehicle speed and sensed lateral acceleration of a vehicle. Thus, the electronic control unit 68 has an input, over a conductor 94, which is a function of vehicle speed. Similarly, the electronic control unit 68 has an input, over a conductor 96, which is a function of lateral acceleration of the vehicle. Similarly, the control unit 84 has an input over a conductor 98, which is a function of vehicle speed and an input, over a conductor 100, which is a function of lateral acceleration of a vehicle.

The invention claimed is:

1. An apparatus for use in turning steerable vehicle wheels, said apparatus comprising:
    a steering member which is axially movable relative to the vehicle to effect turning movement of the steerable vehicle wheels;
    a pinion disposed in meshing engagement with a rack portion of said steering member;
    a steering column connected with said pinion and with a vehicle steering wheel;
    a ball nut assembly connected with an externally threaded portion of said steering member;
    a first motor connected with said steering column at a location between said pinion and the steering wheel; and
    a second motor connected with said ball nut assembly, said second motor being operable to effect rotation of said ball nut assembly relative to said steering member in response to rotation of a portion of said steering column connected to the input of said pinion.

2. An apparatus as set forth in claim 1 further including a closed loop assembly connected with said first motor and said steering column to control operation of said first motor.

3. An apparatus as set forth in claim 2 further including an open loop assembly connected with said second motor and said steering column to control operation of said second motor.

4. An apparatus as set forth in claim 1 further including a housing mounted on a frame of the vehicle, said housing at least partially enclosing said steering member and said pinion.

5. An apparatus as set forth in claim 1 further including a gear unit connected with said steering column at a location between said pinion and said steering wheel, a first sensor connected with said steering column at a location between said gear unit and said steering wheel, a control unit connected with said first sensor, said first sensor providing an output to said control unit as a function of torque applied to and rotation of the steering wheel, said control unit being connected with said first motor and being operable to control the operation of said first motor as a function of the output from said first sensor.

6. An apparatus as set forth in claim 1 further comprising:
    a control unit; and
    a sensor connected to said control unit and to said steering column at a location between said pinion and said steering wheel, said sensor providing an output to said control unit as a function of rotation of the portion of said steering column connected to the input of said pinion, said control unit being operable to control the operation of said second motor as a function of the output from said sensor.

7. An apparatus for use in turning steerable vehicle wheels, said apparatus comprising:
    a steering member which is axially movable relative to the vehicle to effect turning movement of the steerable vehicle wheels;
    a pinion disposed in meshing engagement with a rack portion of said steering member;
    a steering column connected with said pinion and with a vehicle steering wheel;
    a ball nut assembly connected with an externally threaded portion of said steering member;
    a first motor connected with said steering column at a location between said pinion and the steering wheel;
    a second motor connected with said ball nut assembly, said second motor being operable to effect rotation of said ball nut assembly relative to said steering member;
    a gear unit connected with said steering column at a location between said pinion and said steering wheel, a first sensor connected with said steering column at a location between said gear unit and said steering wheel, a control unit connected with said first sensor, said first sensor providing an output to said control unit as a function of torque applied to and rotation of the steering wheel, said control unit being connected with said first motor and being operable to control the operation of said first motor as a function of the output from said first sensor; and
    a feedback sensor connected to said control unit, said feedback sensor being connected to said steering column at a location disposed between said gear unit and said pinion, said feedback sensor providing an output to said control unit as a function of rotation of a portion of the steering column connected to the output of said gear unit.

8. An apparatus for use in turning steerable vehicle wheels, said apparatus comprising:
    a steering member which is at least partially disposed in a housing;

a pinion at least partially disposed in said housing in meshing engagement with a rack portion of said steering member;

a steering column connected with said pinion and with a vehicle steering wheel;

a ball nut assembly connected with an externally threaded portion of said steering member;

a closed loop assembly connected with said steering column, said closed loop assembly including a gear unit connected with said steering column at a location between said pinion and the steering wheel, a first sensor connected with said steering column at a location between said gear unit and the steering wheel, a first control unit connected with said first sensor, said first sensor providing an output to said first control unit as a function of torque applied to and rotation of the steering wheel, a first motor connected with said gear unit and said first control unit, and a feedback sensor connected with said first control unit, said feedback sensor being connected to said steering column adjacent an output of the first gear unit, said feedback sensor providing an output to said first control unit as a function of rotation of a portion of the steering column connected to the output of said first gear unit, said first control unit being operable to effect operation of said first motor as a function of the outputs from said first sensor and said feedback sensor; and an open loop assembly including a second motor connected with said ball nut assembly, and a second control unit connected with at least one of said first and feedback sensors, said second control unit being operable to control operation of said second motor as a function of an output from said at least one of said first and feedback sensors.

9. An apparatus as set forth in claim 8 wherein said at least one of said first and feedback sensors is said first sensor.

10. An apparatus as set forth in claim 8 wherein said at least one of said first and feedback sensors is said feedback sensor.

11. An apparatus as set forth in claim 8 wherein said at least one of said first and feedback sensors is both of said first and said feedback sensor.

12. An apparatus as set forth in claim 8 wherein said second control unit effects operation of said second motor independently of rotation of said ball nut assembly by said second motor.

13. An apparatus as set forth in claim 8 wherein said second motor is connected with said ball nut assembly by a drive belt.

14. An apparatus as set forth in claim 8 wherein said housing is mounted on a frame of the vehicle.

* * * * *